Patented May 6, 1930

1,756,943

UNITED STATES PATENT OFFICE

WALTER FRANKENBURGER AND CHRISTIAN STEIGERWALD, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ARTIFICIAL COMPOSITIONS ESPECIALLY THOSE RESEMBLING RUBBER

No Drawing. Application filed July 5, 1928, Serial No. 290,694, and in Germany July 23, 1927.

This invention relates to the production of artificial compositions, especially those resembling rubber, by polymerizing derivatives of vinyl alcohol, by which are understood, for example inorganic and organic esters and also ethers thereof, for example by heat treatment or by active irradiation, or by treatment with condensing agents, which reactions may, if desired, be accelerated by an addition of catalysts, for example of peroxids, such as benzoyl peroxid, hydrogen peroxid or of anhydrids of organic acids in conjunction with oxygen or agents yielding oxygen.

We have found that artificial compositions, especially compositions similar to or resembling rubber, and exhibiting very good elastic and ductile properties can be obtained from derivatives of vinyl alcohol by polymerizing these substances in the presence of protieds of any origin which term includes their degradation products such as peptones, peptides, diketo-piperazines, or amino acids.

The method we adopt for the preparation of the artificial compositions may consist either in bringing the vinyl compounds and the additions jointly into solution, or in emulsifying the one component in a solution of the other; or the additions, in the form of powder, may be suspended in the liquid vinyl compound and uniformly fine distribution ensured by agitation or stirring. The polymerization of the resulting mixture may be effected either by heating, irradiation with chemically active rays or other known means, or by a combination of these methods in the presence or absence of accelerators.

The heat treatment is usually carried out between about 60° and 120° C., although the polymerization especially when accelerators are employed may be carried out at room temperature or only slightly elevated temperature.

Working under these latter conditions usually furnishes products of higher molecular weight than the aforesaid heat treatment.

The treatment by irradiation may be effected by means of any suitable source of ultra-violet light such as a quartz-mercury lamp or an iron arc lamp.

In this manner products are obtained which are distinguished by high elasticity and are closely allied to natural rubber in many of their properties.

The products may be vulcanized in the usual way, with or without accelerators, and fillers and plasticizing agents may also be added. The quality of the compositions can be further substantially improved by this treatment.

The following examples will further illustrate how this invention may be carried into practical effect, but the invention is not restricted to these examples.

*Example 1*

Vinyl acetate is emulsified in a 10 per cent solution of casein by active stirring, and then subjected to irradiation by a quartz-mercury arc lamp, in a quartz vessel. After a short time a film of the polymerization product will become deposited on the walls of the vessel, this product having very good elastic properties and being easily detached from the walls. The film is very ductile, and on the stretching force being removed, springs back in a manner similar to that displayed by preparations from natural latex.

*Example 2*

Finely powdered albumin is suspended in vinyl acetate, and the mixture, together with a small amount of benzoyl peroxid, is heated from 80° to 90° centigrade on the water bath, with active shaking or stirring. Polymerization ensues in a short time. According to the working conditions, a very elastic skin, or compact elastic mass, is obtained. The products behave like those described in Example 1.

*Example 3*

A suspension, prepared as in Example 2, is heated in the manner there described until a syrupy, but still fluid, mass is formed. The mass is then poured onto a horizontal plate, and the polymerization is completed by irradiation with a quartz mercury lamp. In this manner, and according to the amount poured out per square centimetre of surface, thinner

Example 4

Finely powdered glycocoll is suspended in vinyl acetate and is heated, with addition of benzoyl peroxid, from 80° to 90° C. on the water bath, under a reflux condenser, with active shaking or stirring. The polymerization may also be commenced by warming and completed by irradiation as in Example 3. In both cases, compositions are obtained which are distinguished by high ductility and by the faculty of springing back rapidly into the original shape after being stretched.

Example 5

Finely powdered naphthalene is dissolved in vinyl acetate and is then heated, with an addition of benzoyl peroxid, from 80° to 90° centigrade on the water bath, under a reflux condenser and with active stirring or shaking. The reaction may also be started by warming and completed by irradiation as in Example 3. Finally, the procedure may also consist in treating a benzene solution of polymerized vinyl acetate with naphthalene and distilling off the solvent. In all cases, products with the properties specified in the previous examples are obtained.

What we claim is:—

1. As a new article of manufacture a polymerized derivative of vinyl alcohol, also containing a proteid, which is capable of being stretched and thereafter reassuming its original shape.

2. As a new article of manufacture polymerized vinyl acetate, also containing proteids, which is capable of being stretched and thereafter reassuming its original shape.

3. A process for the production of artificial compositions especially compositions resembling rubber in which a derivative of vinyl alcohol is polymerized in the presence of a proteid.

4. A process for the production of artificial compositions, especially compositions resembling rubber in which vinyl acetate is polymerized in the presence of a proteid.

5. A process for the production of artificial compositions, especially compositions resembling rubber in which a derivative of vinyl alcohol is polymerized by heat treatment in the presence of a proteid.

6. A process for the production of artificial compositions, especially compositions resembling rubber in which a derivative of vinyl alcohol is polymerized at between about 60° and 120° C. in the presence of a proteid.

7. A process for the production of artificial compositions, especially compositions resembling rubber in which a derivative of vinyl alcohol is polymerized by heat treatment in the presence of a peroxid and a proteid.

8. A process for the production of artificial compositions, especially compositions resembling rubber in which a derivative of vinyl alcohol is polymerized at between about 60° and 120° C. in the presence of benzoyl peroxid and of casein.

9. A process for the production of artificial compositions, especially compositions resembling rubber in which a derivative of vinyl alcohol is polymerized by heat treatment in the presence of benzoyl peroxid and of casein.

10. A process for the production of artificial compositions, especially compositions resembling rubber in which vinyl acetate is polymerized at between about 60 and 120° C. in the presence of benzoyl peroxid and of casein.

In testimony whereof we have hereunto set our hands.

WALTER FRANKENBURGER.
CHRISTIAN STEIGERWALD.